United States Patent [19]
Sousa

[11] Patent Number: 4,721,129
[45] Date of Patent: Jan. 26, 1988

[54] RELIEF VALVE

[75] Inventor: Gilbert Sousa, Placerville, Calif.

[73] Assignee: Robert H. Holland, Diamond Springs, Calif.

[21] Appl. No.: 66,997

[22] Filed: Jun. 29, 1987

[51] Int. Cl.⁴ .............................................. F16K 31/12
[52] U.S. Cl. .................................... 137/508; 137/377; 137/538
[58] Field of Search ..................... 137/377, 508, 538

[56] References Cited
U.S. PATENT DOCUMENTS

| | | | |
|---|---|---|---|
| 2,681,074 | 6/1954 | Freutzel | 137/508 X |
| 2,820,475 | 1/1958 | Hobbs | 137/538 X |
| 3,587,623 | 6/1971 | Wilson | 137/538 X |
| 3,826,280 | 7/1974 | Perham | 137/508 X |
| 4,112,971 | 9/1978 | Nilson | 137/508 |
| 4,267,858 | 5/1981 | Lewis | 137/538 X |

*Primary Examiner*—Harold W. Weakley
*Attorney, Agent, or Firm*—Mark C. Jacobs

[57] ABSTRACT

A relief valve for relieving pressure in a system and sealing the same from incoming rain or other moisture or foreign material after relief of pressure. The valve has a spring biased piston which operates internally of the valve to relieve pressure, then reseal in an air-tight manner.

16 Claims, 7 Drawing Figures

RELIEF VALVE

BACKGROUND OF THE INVENTION

Field of the Invention

The invention relates to relief valves; and, more particulary, to a permanently mounted relief valve having a raincap for resealing of the valve after relief of pressure.

DESCRIPTION OF THE PRIOR ART

Vehicles powered by LP gases or propane gas, or similar pressurized containers having such gases for cooking or the like, must have some means for relieving pressure internally of the cylinder or tank. In the prior art, internal relief valves are used that pivot open to release pressure, then return to a closed position. However, rain or other moisture can get into these valves and the valve can rust. The poppet and seat can also get damaged.

These prior art valves have raincaps associated therewith to keep out moisture and dirt and the like. However, such prior art raincaps are loose fitting and not a permanent part of the valve, such as a loose fitting plastic cover, a pipe with a metal flap, or a sheet of plastic tied around the end of a vent pipe. Some prior art devices use wire guides for the raincap which guides are particularly susceptible to corrosion. Such prior art devices are not permanent and do not vent escaping LP gases within a predetermined angle to the vertical (as may be necessary in some installations) and may be dislodged by external forces acting thereon. These devices also have openings or weep holes that must remain unobstructed to enable the valve to work properly. These holes can get clogged or allow moisture to enter the valve.

There is a need for a safety relief valve for LP gases or the like which seals and reseals automatically get has a raincap that cannot be dislodged, is not subject to damage from water, dirt or other foreign material and has a directed flow of vented gases so that the gases are vented in a predetermined desired direction in any emergency.

SUMMARY OF THE INVENTION

It is an object of this invention to provide an improved relief valve for propane fueled vehicles, tanks and containers.

It is a further object of this invention to provide a relief valve having a permanently mounted internal raincap for keeping dirt, water and other foreign matter out of the interior of the valve.

It is still another object of this invention to provide such a relief valve which can be quickly and easily modified to seal and unseal under heavy and light conditions.

These and other objects are preferably accomplished by providing a valve having a spring biased piston which operates internally of the valve to relieve pressure, then reseal in an airtight manner.

DESCRIPTION OF THE PREFERRED EMBODIMENT

Figure 1:
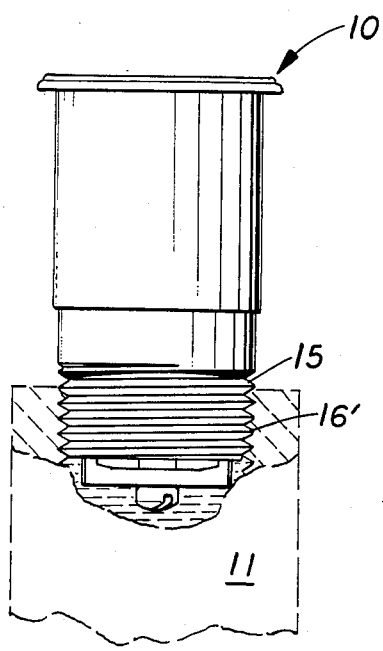
FIG. 1 is a vertical view of a pressure relief valve in accordance with the teachings of the invention mounted in the top of a vent tube.

Referring now to FIG. 1 of the drawing, a pressure relief valve 10 in accordance with the teachings of the invention is shown mounted to the top of a vent tube 11. It is to be understood that tube 11 may be a pipe leading to an engine compartment, such as a pipe mounted outboard on a bus or other vehicle fueled by LP gas. In this case, valve 10 is acting as a raincap for the main relief valve of the engine of the vehicle. However, valve 10 could be coupled directly to the top of a LP gas tank or the like and thus function as both a primary relief valve and raincap, the structure and operation, except for the selection of the pressure of the internal spring, being otherwise identical.

Figure 2:
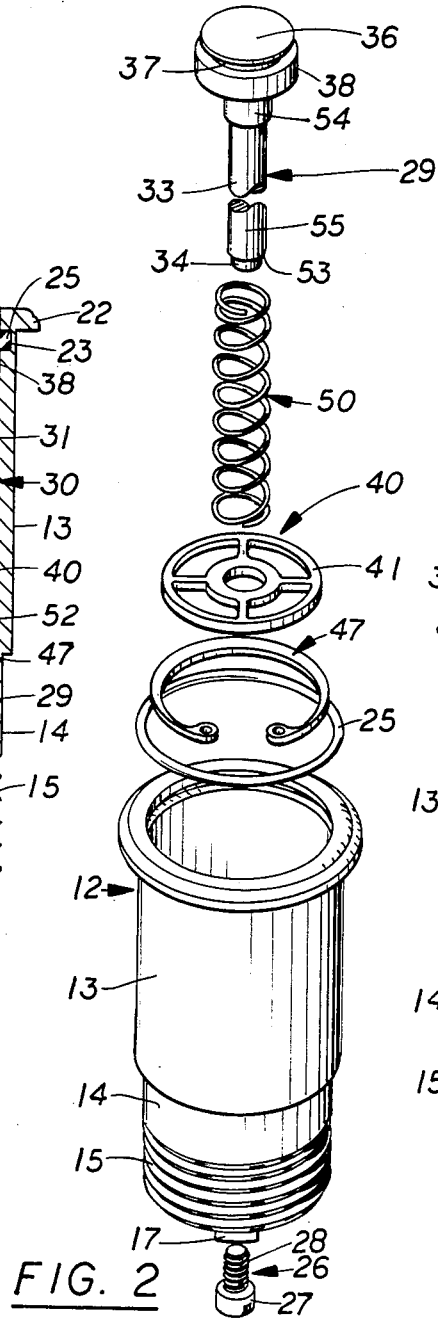
FIG. 2 is an exploded view of the valve along of FIG. 1.

Thus, valve 10 is shown in exploded view in FIG. 2. Valve 10 includes main casing 12 having a cylindrical body portion 13, a second integral cylindrical body portion 14 of lesser outer diameter than portion 13 and an integral cylindrical threaded portion 15 generally of the same outer diameter as portion 14 and adapted to mate with like threads 16' internally of pipe 11 as seen in FIG. 1. The rear end (right side in FIG. 2) of casing 12 is partially closed of by wall 16 with a bridge 17 extending across the opening 18 in wall 16. A central throughhole 19 is provided in the center of bridge 17.

Figure 4:
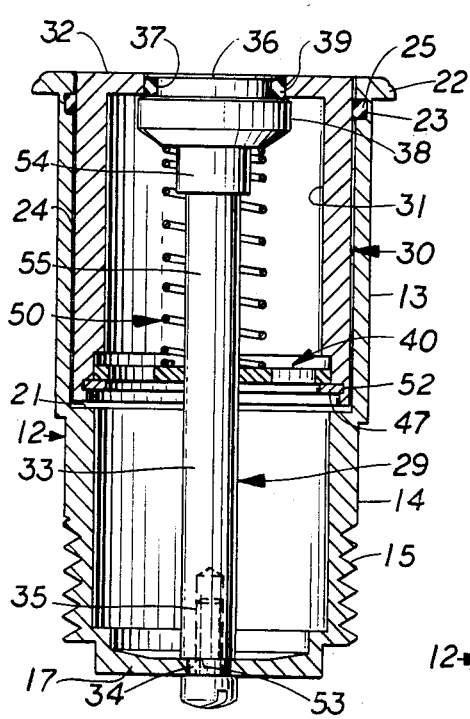
FIG. 4 is a vertical cross-sectional view of the assembled parts of the valve of FIGS. 1 to 3; (piston in closed position)

As seen in FIG. 4, an internal shoulder is provided where threaded portion 15 is closed off by wall 16. A like internal shoulder 21 is provided at the intersection of body portions 13 and 14. The upper end of casing 12 is provided with an annular flange 22 and a groove 23 is provided on the interior wall 24 of casing 12 adjacent flange 22 adapted to receive a resilient O-ring 25 therein (see also FIG. 2).

Screw 26 has a slotted head 27 and a threaded shank 28 for insertion into and through hole 19 for threaded engagement to post 29 as will be discussed.

A cylindrical piston 30 having a throughbore 31 (see FIG. 4) is slidably mounted in the interior of casing 12 stopped in its downward movement by engagement with shoulder 21. Piston 30 has an annular flange 32 at the upper end thereof. Post 29 is mounted in piston 30 and has a cylindrical shank 33 with a terminal end 34, also cylindrical but of lesser outer diameter than the remainder of shank 33. As seen in FIG. 4, a threaded bore 35 is provided in the end of shank 33 remote from enlarged head 36 receiving therein screw 26, when assembled, as will be discussed. Also, as seen in FIG. 4, shank 33 has a portion 54 adjacent the head 36 of an outer diameter greater than the outer diameter of lower portion 55 which portion 54 acts as a stop against hub 42 (as will be discussed). An annular groove 37 is provided in head 36 above a flange 38, of an outer diameter greater than the remainder of head 36, both portions being generally cylindrical. An O-ring 39 is disposed in groove 37.

Figure 5:
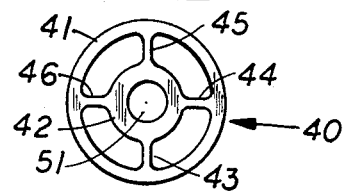
FIGS. 5 and 6 are plan views of two of the components of the valve of FIG. 2.

Referring again to FIG. 2, the parts not heretofore described include a spring retainer or spider 40 (see also FIG. 5) which includes an annular outer ring 41, an inner hub 42, and a plurality of arms, such as radial arms 43 through 46, interconnecting ring 41 to hub 42. The opening 51 in hub 42 is smaller in diameter than the outer diameter of shank portion 54 of post 29. The entire retainer 40 may of course be flat and made from a single piece of suitable material and may be of any desired configuration providing openings therethrough.

Figure 6:
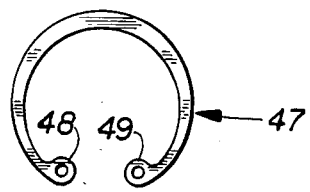

The parts in FIG. 2 also include a snap ring 47 (see also FIG. 6) which is a split resilient ring terminating in rounded apertured ends 48, 49.

Finally, the parts in FIG. 2 include a coiled spring 50 of a preselected tension.

Figure 3:
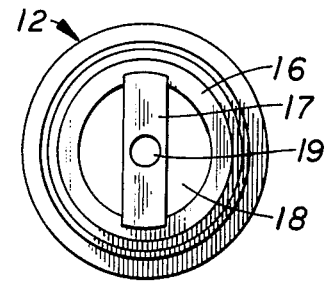
FIG. 3 is a view of item 12 toward the end with the bridge.

In assembling the parts shown in FIG. 2, the O-ring 39 is placed in groove 37 of post 29 and spring 50 is placed around shank 33 abutting against the underside of flange 39 (FIG. 4). The post 29, with spring 50 and O-ring 39 mounted thereon, is inserted into piston 30 until flange 38 abuts against the underside of flange 32 (see FIG. 3). The spring retainer 40 is now placed on shank 33, the shank entering the hole 51 in hub 42 (FIG. 5) and snap-ring 47 is snapped into an annular groove 52 (FIG. 4) formed in the end of piston 30 opposite flange 32. This retains all of the parts together in position within piston 30. Spring 50 biases the post 29 up against flange 32, the outer surfaces of the head 36 of post 29 and flange 32 being generally flush.

O-ring 25 is now snapped into groove 23 in casing 12 and the assembled post sub-assembly is inserted through the flanged end of casing 12 with the reduced diameter end 34 of shank 33 entering hole 19 in bridge 17. Hole 19 and end 34 are generally of the same diameter but there is sufficient clearance to allow end 34 to be inserted therein and the shoulder 53 (FIG. 2) abuts against the interior of bridge 17. Screw 26 is now threaded into hole 35 and the assembly is complete. The final assembly is shown in FIG. 4. The outer surface of flange 32 is flush with the outer surface of flange 22. This is the normal closed position.

As seen in FIG. 1, the valve 10 is threaded into pipe 11 by engagement of threaded portion 15 with threads 16' in pipe 11.

Figure 7:
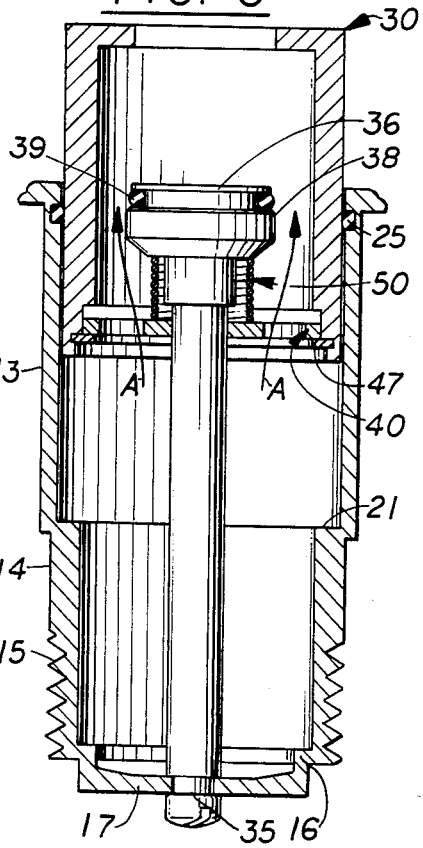
FIG. 7 is a view similar to FIG. 4 showing the piston in open position.

In operation, when the pressure within pipe 11 exceeds a predetermined amount, as seen in FIG. 7, the spring resistance (preselected depending upon the environment) is overcome and the piston 30 moves upwardly also moving spring retainer 40 by engagement of snap ring 47 therewith. This compresses spring 50 between flange 38 and retainer 40 about shank portion 54 as seen in FIG. 7. Piston 30 slides against O-ring 25 providing a leakproof seal and the upward extent thereof is determined by the type of spring 50, the length or spacing between flange 38 and retainer 40, the abutment of hub 42 with shank portion 54 (the lengths all being variable), etc. However, as particularly contemplated in the present invention, a light spring 50 may be used when valve 10 is used as a raincap and there is a basic or main relief valve associated with the vehicle engine or the like. A heavy spring 50 is used when the relief valve is used as the main or primary valve.

The gas escapes out of the openings in retainer 40 between the arms 43 to 46, outer ring 41 and hub 42 as indicated by the arrows, A, in FIG. 7. When a sufficient amount of gas has escaped to relieve the pressure in the system, the spring 50 returns the piston 30 automatically to the FIG. 4 position, head 36 entering the opening in flange 32, O-ring 39 providing a seal therebetween.

The various components may be made of any suitable materials, such as brass, stainless steel, steel coated with zinc, wire rings of stainless steel, resilient rubber O-rings, etc. and of any suitable dimensions. The spring pressure can be predetermined and preset in production.

It can be seen that I have disclosed an improved raincap which meets National Fire Protection Association (N.F.P.A.) and most states' fire portection requirements. The valve can be used as a raincap on the tube coming from the relief valve for systems, such as cars, where the main relief valve is internal. By modifying the internal spring, the device can serve as the pressure relief valve itself in those cases where a valve would be mounted externally, such as a compressor. Thus, changing the internal spring adapts the device to the use desired.

The invention is suited to both industrial and commercial use and can be made to need only about three to five pounds of pressure to vent. It operates to seal and reseal automatically. The raincap disclosed herein is a permanent installation and meets and even surpasses most requirements. It is not subject to the intrusion of water, dirt and other foreign materials and can't be dislodged or rendered inoperable. Water, for example, entering a valve can freeze rendering it inoperative. There is no drain or weep hole to let moisture or foreign material into the valve and the valve directs the escape of gases. There is no need to orient the valve in any one particular direction.

Any suitable means can be used to mount valve 10 to a desired gas source. The valve herein has particular application in propane gas engines since it acts as a raincap and avoids problems of such valves becoming inoperative due to rain, moisture and foreign matter entering the same in highway use.

Although a particular embodiment of the invention has been claimed, the invention herein may be varied in any suitable manner that may occur to an artisan and the invention is only to be limited by the appended claims.

I claim:

1. A relief valve comprising:

a main housing having a throughbore and an inner wall surrounding the throughbore with an annular shoulder on said inner wall between the open ends of said housing;

a piston reciprocally and slidably mounted in said housing of an outer diameter greater than the inner diameter of said housing between said shoulder and one open end thereof, the overall length of said piston being substantially the same as the overall length in said housing between said shoulder and the other open end thereof, said piston also having a throughbore and open at each end with an integral annular flange surrounding the opening in said piston remote from said one open end of said housing;

a post having an enlarged head mounted in the throughbore of said piston and said housing having its enlarged head normally disposed in the opening surrounded by the annular flange of said piston with the outer surfaces of said head and said flange when said head is normally disposed in said opening being substantially flush and said enlarged head having a flange portion of an outer diameter greater than the outer diameter of the remainder of said head abutting against the underside of said flange when said head is normally disposed in said opening, said post further including an elongated shank extending from said head and secured to said housing adjacent the other open end thereof; and resilient means associated with both said post and said piston for normally resiliently biasing said piston in a direction inwardly of said housing whereby, when said piston is moved away from said one open end of said housing, said resilient means returns said piston back to its normal position wherein the outer surfaces of said head of said post and said flange are flush.

2. In the valve of claim 1 including a resilient means retaining element mounted to said shank whereby said shank is movable therethrough; and openings in said element allowing fluids to pass therethrough.

3. In the valve of claim 2 including a stop member mounted on said piston adjacent the open end remote from the opening surrounded by said flange, said element being mounted on said post between said stop member and said flange, the inner diameter of said stop member being less than the outer diameter of said element so that said stop member arrests the downward movement of said element.

4. In the valve of claim 1 including fluid sealing means associated with the inner wall of said piston and the outer wall of said head.

5. In the valve of claim 4 wherein said sealing means includes an annular groove in said head about the outer periphery thereof, and a resilient O-ring mounted in said groove.

6. In the valve of claims 1 including fluid sealing means associated with the inner wall of said housing adjacent the other open end thereof and the outer wall of said piston adjacent the flanged open end thereof.

7. In the valve of claim 6 wherein said last-mentioned fluid sealing means is an annular groove in the inner wall of said housing and a resilient O-ring mounted therein.

8. In the valve of claim 1 wherein said shank extends along generally the central longitudinal axis of said housing and is secured to said one open end thereof by a bridge extending across said one open end.

9. In the valve of claim 8 wherein the end of said shank connected to said bridge has a threaded aperture therein, said bridge having a hole therethrough coaxially aligned with said threaded aperture, and a screw extending through the hole in said bridge and threaded into said threaded aperture.

10. In the valve of claim 1 including a resilient means retaining element mounted to said shank whereby said shank is movable therethrough and openings in said element allowing fluids to pass therethrough, said shank including a first portion adjacent said head of a first outer diameter and a second portion extending therefrom of a lesser outer diameter, said element having a central opening through which said shank extends of an inner diameter less than said first outer diameter to provide a stop for said element.

11. In the valve of claim 10 including a stop member mounted on said piston adjacent the open end remote from the opening surrounded by said flange, said element being mounted on said post between said stop member and said flange, the inner diameter of said stop member being less than the outer diameter of said element so that said stop member arrests the downward movement of said element.

12. In the valve of claims 1 wherein said resilient means is a coiled spring surrounding the shank of said post.

13. In the valve of claim 1 wherein said resilient means is a coiled spring and a spider is mounted on said shank having an outer ring and a central apertured hub receiving said shank therethrough with spaced arms interconnecting said hub to said ring providing spaces therebetween.

14. In the valve of claim 1 wherein the outer surface of said piston, the inner surface of said opening in said piston flange, the outer surface of said head, and the inner surface of said housing are all cylindrical.

15. In the valve of claim 1 wherein said housing has an externally threaded section adjacent said one open end thereof.

16. A relief valve comprising:
a cylindrical housing having a throughbore;
a piston reciprocally mounted in said housing also cylindrical in cross-section and in fluid sealing engagement with the inner wall of said housing; and
a spring biased post mounted in said housing having an enlarged head portion cylindrical in cross-section and in sealing engagement with a circular opening in said piston when said spring bias is such that said piston is disposed within said housing with its outer face surrounding said head and flush thereto, said piston being adapted to move out of said housing away from said head when said spring bias is overcome.

* * * * *